(12) United States Patent
Boubeddi et al.

(10) Patent No.: US 9,687,106 B2
(45) Date of Patent: Jun. 27, 2017

(54) BEVERAGE MAKERS WITH INTERCHANGEABLE COMPONENTS

(71) Applicant: The Richards Corporation, Sterling, VA (US)

(72) Inventors: Abdelaziz Boubeddi, Ashburn, VA (US); Mohammad Ghalambor, Sterling, VA (US); Ali Olfat, Reston, VA (US)

(73) Assignee: The Richards Corporation, Sterling, VA (US)

( * ) Notice: Subject to any disclaimer, the term of this patent is extended or adjusted under 35 U.S.C. 154(b) by 0 days.

(21) Appl. No.: 14/069,403

(22) Filed: Nov. 1, 2013

(65) Prior Publication Data

US 2014/0120223 A1    May 1, 2014

Related U.S. Application Data

(60) Provisional application No. 61/721,106, filed on Nov. 1, 2012.

(51) Int. Cl.
*A47J 31/40* (2006.01)
*A47J 31/44* (2006.01)

(52) U.S. Cl.
CPC ......... *A47J 31/407* (2013.01); *A47J 31/4467* (2013.01)

(58) Field of Classification Search
CPC ... B67D 3/0019; A47J 81/407; A47J 81/4467; A47J 31/4467; A47J 31/3676; A47J 31/3685; A47J 31/00; A47J 31/0668; A47J 31/407; A47J 31/46; A47J 31/0663

USPC .................................. 99/284, 289, 295, 302
See application file for complete search history.

(56) References Cited

FOREIGN PATENT DOCUMENTS

| CN | 201005523 | | 1/2008 |
|---|---|---|---|
| CN | 201005523 Y | * | 1/2008 |
| CN | 201061463 | | 5/2008 |
| CN | 201346129 | | 11/2009 |
| CN | 201346129 Y | * | 11/2009 |
| WO | 20100134054 | | 11/2010 |
| WO | WO 2010134054 A2 | * | 11/2010 |

OTHER PUBLICATIONS

Definition of "Rail", Dictionary.Com, pub. Apr. 18, 2009 <https://web.archive.org/web/20090418115515/http://dictionary.reference.com/browse/rail?jss=1>.*
Partial Oral Translation of Xie Reference (CN 201346129). Paragraph 22.*
Formal translation of Xie et al (CN201346129Y).*
PCT/US2013/067914, International Search Report and Written Opinion, Dec. 4, 2013, 7 pages.
International Patent Application No. PCT/US2013/067914, International Preliminary Report on Patentability dated May 14, 2015.

* cited by examiner

*Primary Examiner* — Viren Thakur
*Assistant Examiner* — Thanh H Nguyen
(74) *Attorney, Agent, or Firm* — Kilpatrick Townsend & Stockton LLP; Dean W. Russell; Kristin M. Crall

(57) ABSTRACT

Embodiments of the present invention provide beverage makers and their ability to be made modular, such that the beverage maker may brew beverages using interchangeable components. One embodiment relates to an espresso maker that can brew a coffee or espresso beverage using different types of modules.

11 Claims, 5 Drawing Sheets

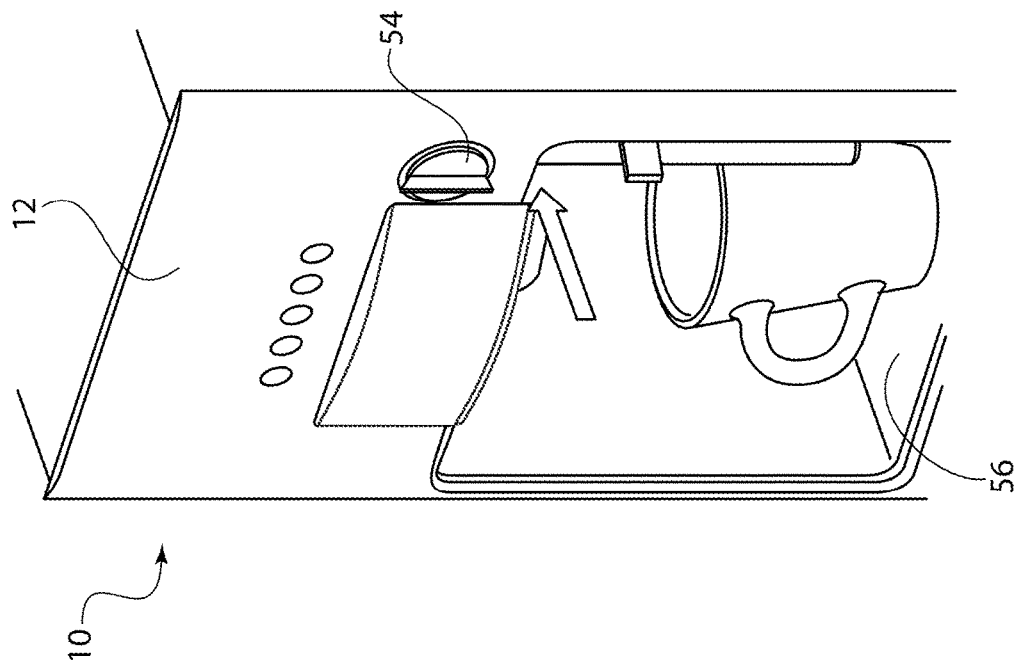
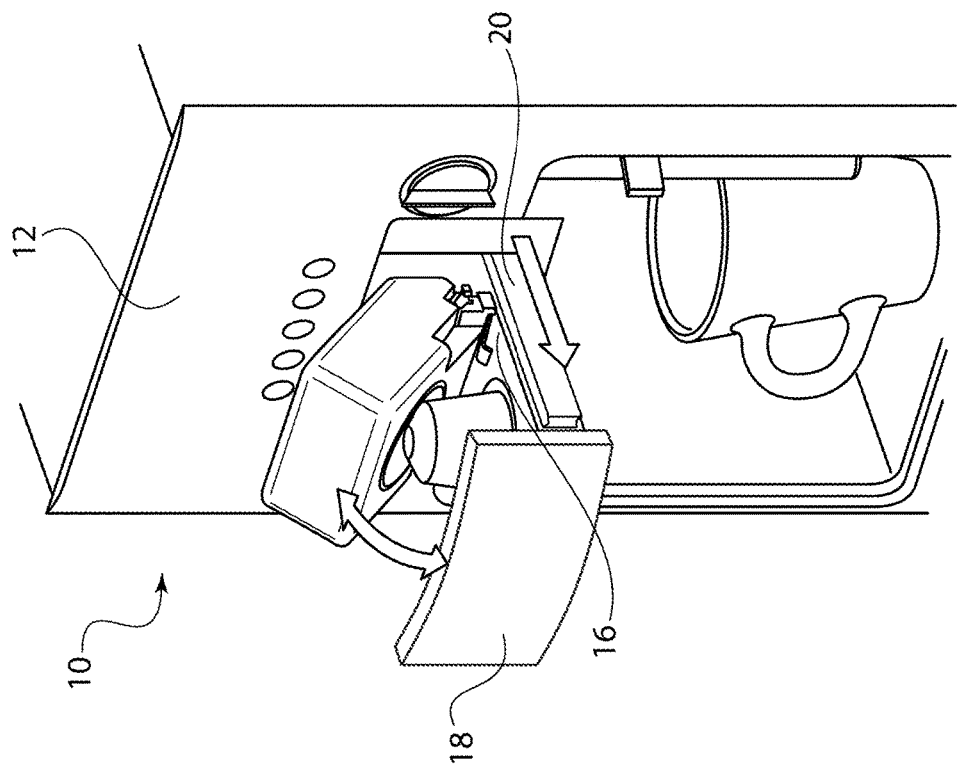

BEVERAGE MAKERS WITH INTERCHANGEABLE COMPONENTS

CROSS REFERENCE TO RELATED APPLICATIONS

This application claims the benefit of U.S. Provisional Application Ser. No. 61/721,106, filed Nov. 1, 2012, titled "Espresso Maker with Rail Mounted Modular Brew Heads," the entire contents of which are hereby incorporated by reference.

FIELD OF THE INVENTION

Embodiments of the present invention relate generally to beverage makers and their ability to be made modular, such that the beverage makers may brew beverages using interchangeable components. One embodiment relates to an espresso maker that can brew a coffee or espresso beverage using different types of modules.

BACKGROUND

Beverage makers are typically designed to work with a single specified module. For example, loose coffee brewing systems generally have a brew basket that can receive a filter for loose espresso or coffee grounds or pre-packaged grounds. A typical espresso maker generally has a small basket with holes at the base thereof into which the espresso powder or grounds are placed. Newer style beverage makers have interior components that are designed to work with specially-designed and shaped capsules, such as Keurig or Nespresso machines.

These machines have internal features that are specifically shaped to hold the particular brand or style of capsule, pod, or loose grounds in order to force water therethough and to create the desired espresso or other coffee drink. For example, a certain brand X machine may be designed for use only with brand X capsules or cups. This can limit the end user or consumer to purchasing only the coffee pods, capsules, or cups that work with the particular purchased machine. For example, if an airline wishes to offer coffee drinks, such as coffee, espresso, or cappuccino on-board its aircraft, the airline typically selects the coffee form it desires (e.g., a particular brand of pods or capsules or easy serving espresso pods), and then installs the appropriate machines on its fleet.

However, brewing beverages on an aircraft or other passenger transport vehicles can present challenges to these single module systems. For example, the beverage makers are typically mounted into the aircraft galley for safety reasons, so if the aircraft desires to change providers of the type of brewed beverage it serves, it can require a potentially expensive re-work of the galley. If beverage makers are purchased in bulk to be installed on a fleet of aircraft, being limited to one form of coffee capsule or pod can be disadvantageous in a number of instances. For example, an aircraft may not wish to be locked into only one supplier for the life of the aircraft fleet that has been fitted with a particular machine brand. A supplier may raise costs to a prohibitive level, may discontinue particular flavors, may change the shape or form of their product packaging, or may not offer options that are green or recyclable, conflicting with a company's desire or mission to be environmentally friendly. There are a number of other reasons why a particular airline may desire interchangeability and flexibility in the types of coffee and/or espresso it serves.

BRIEF SUMMARY

Embodiments of the invention described herein thus provide a beverage maker that can receive interchangeable components. In a specific embodiment, the beverage maker has a slidable system that can receive a first type of grounds holder, but that may be switched out for a different type of grounds holder. Such beverage makers find particular use on-board passenger transport vehicles such as aircraft, but may be useful in a number of other locations.

BRIEF DESCRIPTION OF THE DRAWINGS

FIG. 1 shows a side perspective view of one embodiment of a beverage maker that uses interchangeable components, having a first type of component in place in an open drawer.

FIG. 2 shows the beverage maker of FIG. 1 with the drawer in a closed position.

DETAILED DESCRIPTION

Currently, an airline must decide what type/brand of brewed beverages it intends to serve and install the corresponding machines in its fleet. It is, however, desirable to provide a single beverage maker that can accept various different forms of coffee and/or espresso grounds. This way, if an airline decides to switch beverage types (e.g., to switch from using capsule modules to using POD modules or another container of grounds), the airline may do so without switching out all of the beverage makers in its fleet.

Although the desire for interchangeability is described herein with respect to airlines/aircraft usage, it should be understood that there are other instances when interchangeability may also be desired. For example, a particular company or restaurant with multi-office sites may wish to purchase one type of machine for all locations, but to have long-term flexibility on coffee suppliers or interchangeability at individual sites.

Accordingly, the present inventors have sought to provide a beverage maker that provides interchangeability between variously-packaged coffee grounds.

Figure 3:
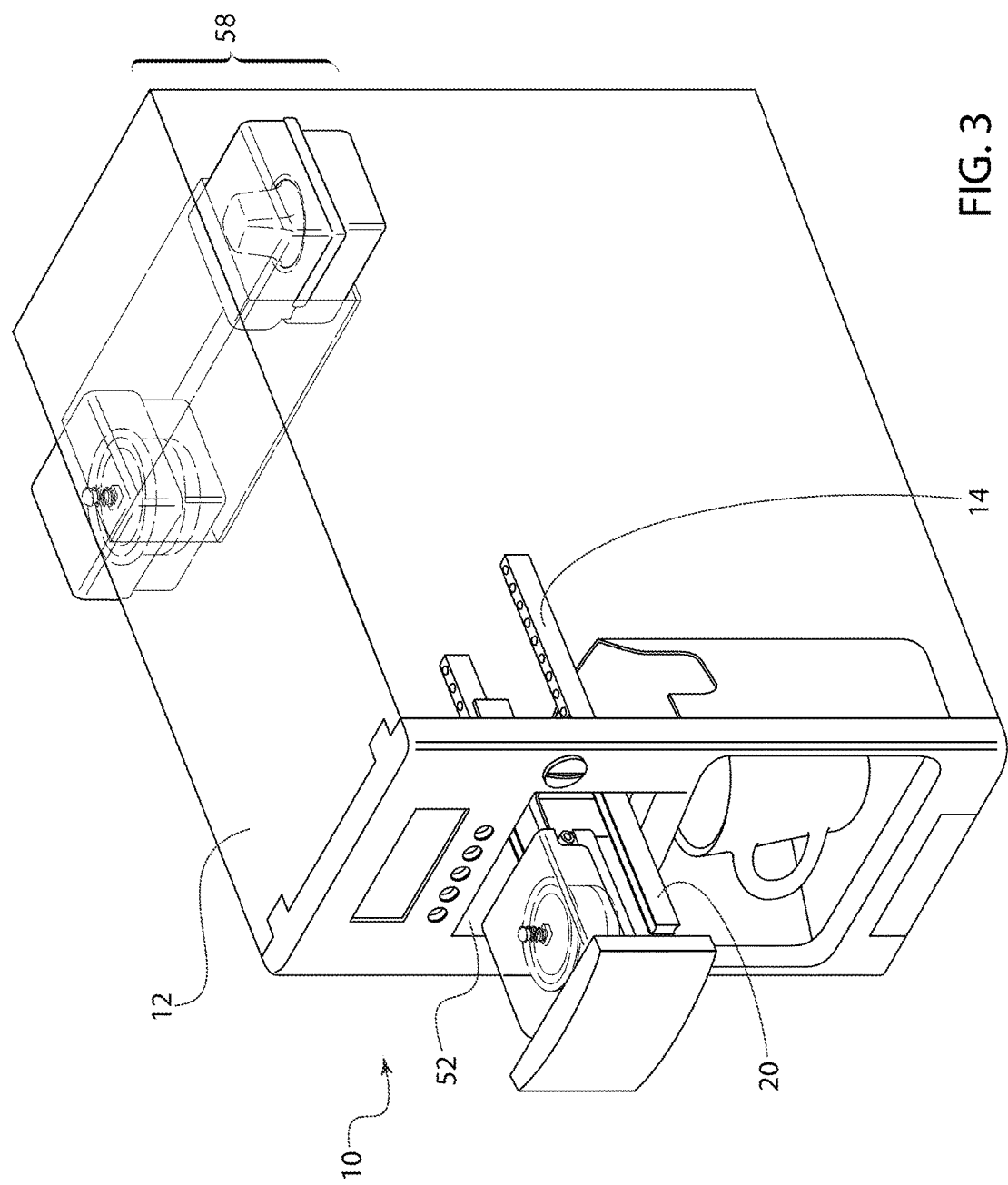
FIG. 3 shows the beverage maker of FIG. 1 with a different component in place.

Embodiments of the present invention thus provide a beverage maker, such as a coffee maker or an espresso maker, that can brew beverages using various types of coffee grounds holders. As shown in FIGS. 1-3, the beverage maker system 10 includes a beverage maker body 12 with internal rails 14. The body 12 comprises the internal working that are typical of a coffee or espresso maker. The body 12 may be mountable or secured to a galley wall, such that it would be acceptable for use in a passenger transport vehicle, such as an aircraft. The body 12 may also be plumbed in-line with the potable water tank on-board a vehicle.

In one embodiment, a drawer 16 cooperates with the internal rails 14 of the body 12. The drawer 16 may have a front plate 18 that functions as a face for the drawer 16 and that covers the internal components. The drawer 16 may also have side rails 20 that run along the internal rails 14 in use. In an alternate embodiment, the body 12 may have internal grooves against which external protrusions of the drawer may cooperate. In a further embodiment, the body 12 may have base hinges and the drawer 16 may tilt open and closed from the body 12 to reveal an interior space 22. Any configuration that allows the drawer 16 to cooperate with and be moveable with respect to the body 12 is possible.

Figure 4:
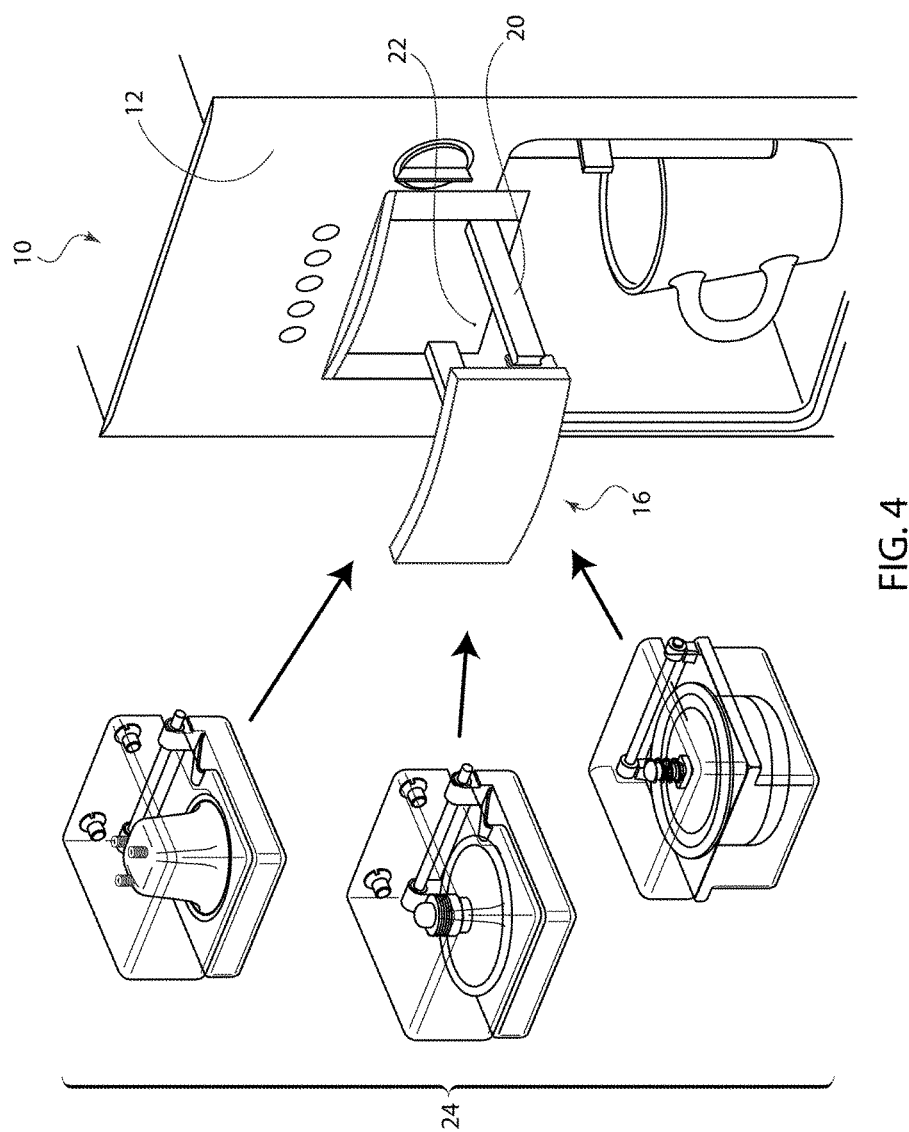
FIG. 4 shows a beverage maker with a slidable drawer and illustrates a series of different components that may be useable therewith.

As shown in FIG. 4, an interior space 22 of the drawer 16 is also provided. Interior space is configured to receive and support one or many of a series of components 24. In one embodiment, the interior space 22 may be an empty space bounded by side rails 20, as shown. Alternatively, the interior space 22 may have a bottom portion onto which a component 24 may rest. Any configuration that allows the drawer 16 to cooperate with and house a component 24 is possible. An alternate embodiment of the body 12 does not use a drawer but provides features on a grounds-containing component 24 that cooperate directly with the body 12.

Figure 5:
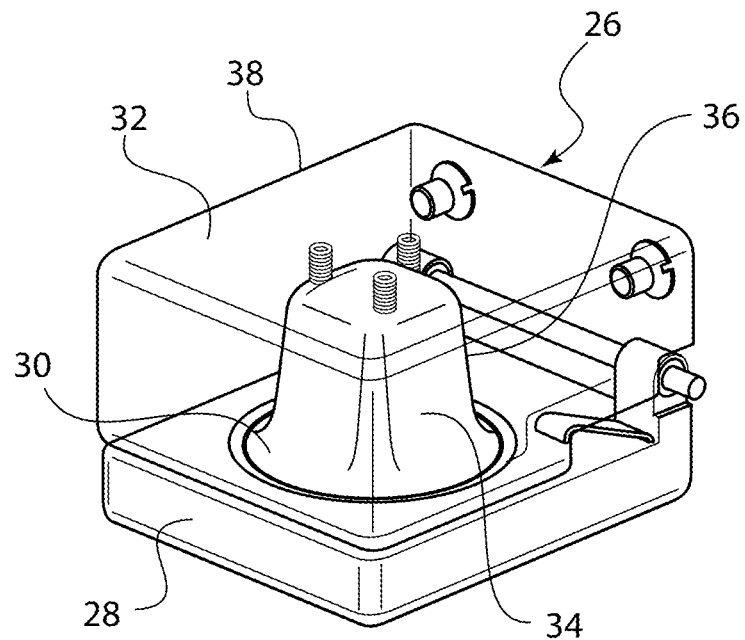
FIG. 5 shows one embodiment of a capsule module component that may be used with the beverage makers described herein.

As shown in FIGS. 4-7, multiple grounds-containing components may be provided. The series of components 24 is generally designed to fit into the body 12 similarly. This allows a beverage maker system 10 user to use a single body 12 to brew beverages that use different modules by having various components 24. For example, as shown in FIG. 5, a first component 24 may be a capsule module component 26. The capsule module component 26 is shown as having a base 28 with a capsule receiving portion 30. The capsule receiving portion 30 may be sized and configured to receive a particular brand, shape, or type of capsule. A capsule cover 32 may also be provided. The capsule cover 32 may be hinged to the base 28, such that the capsule module component 26 is openable to receive a capsule 34 and closable for insertion into the body 12. The capsule cover 32 has an opening 36 into which the capsule may fit. The opening 36 should generally be sized to fit the capsule 34 in a snug fashion so that when water is steamed through the capsule 34, it maintains its position on the capsule receiving portion 30 of the base 28.

It is possible to provide variously-sized capsule module components 26 having different capsule receiving portions 30 and opening 36 sizes so that the capsule component 26 can house different capsules with different sizes from different manufacturers. However, the outer profile 38 of the capsule component 26 should generally be consistent across all components 26 so that they are interchangeable with the body 12.

Figure 6A:
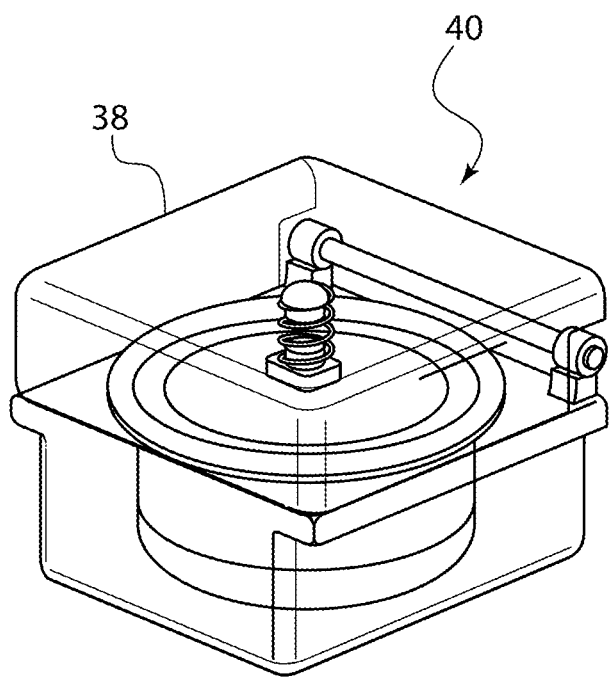
FIG. 6A shows one embodiment of an espresso loose coffee module component that may be used with the beverage makers described herein.
Figure 6B:
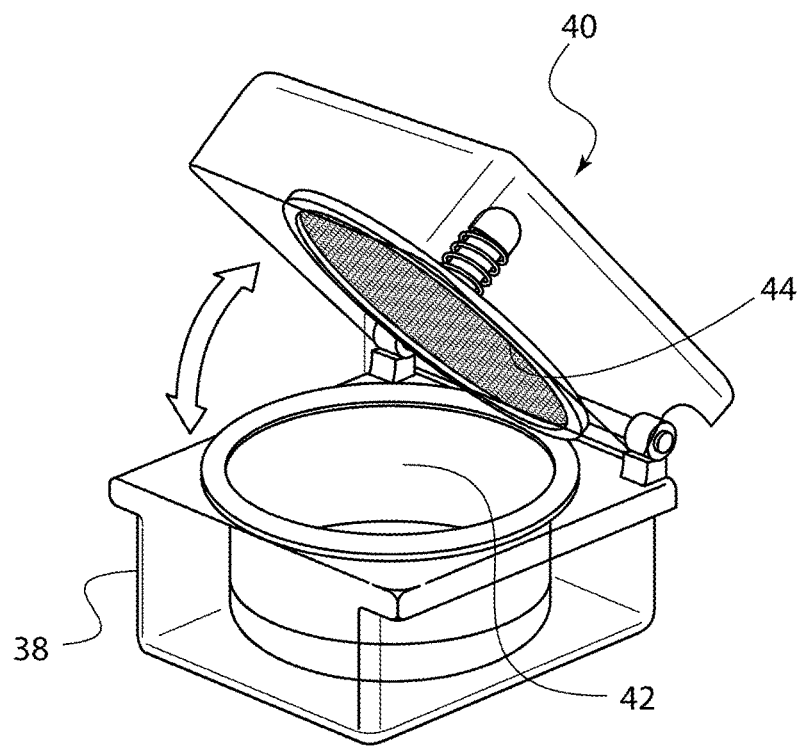
FIG. 6B shows the component of FIG. 6A with the cover in an open position.

A second component 24 may be a loose espresso coffee grounds module component 40. Examples of this component 4 are shown in FIGS. 6A and 6B, in the closed and open position, respectively. The coffee module component 40 is shown as having a coffee containing portion 42 and a cover 44. The cover 44 may be hinged to the coffee containing portion 42, such that the coffee module component 40 is openable to receive a loose coffee grounds or a pre-packaged filter bag of coffee and closable for insertion into the body 12. The outer profile 38 of the coffee grounds module component 40 should generally be consistent with other components of the system so that they are interchangeable with the body 12.

Figure 7:
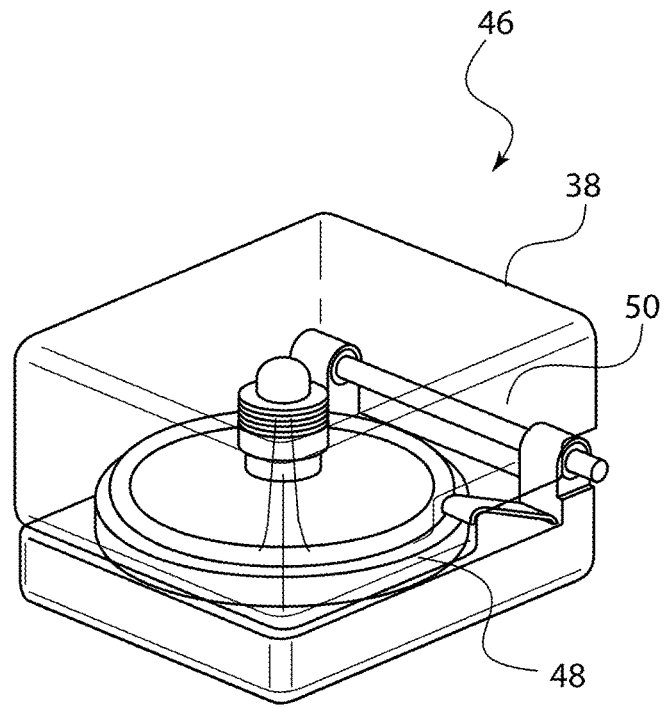
FIG. 7 shows one embodiment of an easy serving espresso (ESE) pod module component that may be used with the beverage makers described herein.

A third component 46 may be a pod module component 46. An exemplary component 46 is shown in FIG. 7. Espresso pods may also be referred to as "easy serving espresso" (E.S.E.) pods. They are paper pouches filled with find-ground coffee for an easy single serving. The pod module component 46 is shown as having a pod-containing portion base 48 with a cover 50. The pod containing portion 48 may be sized and configured to receive a particular brand, shape, or type of pod. Alternatively, the pod containing portion 48 is provided as a small indented area that can receive differently-sized pods. (It is expected that component 46 could also hold a tea bag instead of a pod for fast brewing if desired.) Holding the pod in the proper orientation with respect to the brewing injector head may enhance the flavor of the beverage that is brewed. The cover 50 may be hinged to the portion 48, such that the pod module component 46 is openable to receive a pod and closable for insertion into the body 12. The outer profile 38 of the capsule component 46 should generally be consistent with other components in the system so that they are interchangeable with the body 12.

It is possible to design additional components 24 that house different types of brewing capsules or containers as they may be developed in the industry. In most instances, the only design constraint is to ensure that the outer profile 38 of the component 24 is design to cooperate with the body.

In an alternate embodiment, because the components all generally have two halves, it is possible to fix the top half (the part that cooperates with the brew head) into the body and only interchange the lower half (the part that receives the coffee form). The lower half may be positioned on the 16 drawer and moved in and out as needed. In an alternate embodiment, the lower half may be secured to the top half via a twisting connection, a screwing connection, a J-lock, magnetically, or any other appropriate locking mechanisms.

In use, one of the series of components 24 is loaded or filled with the appropriate beverage form, whether a capsule, loose grounds, a coffee pod, a tea bag, or any other form. The component 24 is then positioned in the drawer 16. It may sit on side rails 20; it may be nested in between side rails 20; it may sit on a base of drawer, if provided; it may have an outer ledge that allows it to cooperate with side rails 20; or any other method or system may be used. The drawer 16 is then slid into the opening 52 of the body 12. In an alternate embodiment, the component 24 may be loaded directly into an opening 52 of the body.

The opening 52 is fluidly connected to a brew injector head or other hot water delivery head. Once the component 24 is positioned, brewing may begin by activation of a manual or electric start button 54 or automatically upon recognition of the component 24 being positioned. The brewed beverage may be dispensed at a dispensing area 56. Once the brewing cycle is complete, the user slides drawer 16 out and may re-use the same component or may choose to use a different brewing method with a different component without any changes to be made to the system 10.

Because a user or airline will typically select one type of beverage brewing method and will use that method for at least an extended period of time, the other components 24 that are provided with the system 10 may need to be stored. The body 12 thus has a storage area 58 for storing the unused components while a particular type of beverage is being used. The storage area 58 may have doors that secure the unused components in an open space. Additionally or alternatively, the components may slide in on rails and be individually secured and stored. Additionally or alternatively, the storage space 58 may have one or more drawers that store the unused components. Any number of options are possible and considered within the scope of this disclosure.

In an alternate embodiment, the drawer 16 may be made deeper, such that unused components sit in the back of the drawer, away from the beverage maker brew head. The components may sit side-by-side or back to back.

Changes and modifications, additions and deletions may be made to the structures and methods recited above and shown in the drawings without departing from the scope or spirit of the invention and the following claims.

What is claimed is:

1. A beverage maker brewing apparatus with interchangeable brewing components, comprising
   (a) a beverage maker body;
   (b) a drawer configured to cooperate with the beverage maker, the drawer having an interior space configured to receive one of a series of interchangeable components;
   (c) a series of interchangeable components designed to contain different types of brewing capsules or modules, each of the different components in the series of interchangeable components comprising a cover, a base, and a grounds receiving portion that is sized and configured to receive a particular type of capsule or pod or loose coffee grounds, and wherein each of the components comprises an outer profile that is consistent with the outer profile of the other components in the series of interchangeable components so that each component is interchangeable with the beverage maker body, the series of interchangeable components comprises a first interchangeable component and a second interchangeable component,
      wherein the first interchangeable component comprises a hinge securing the cover to the base, the base configured to be secured into the drawer, wherein the cover defines the grounds receiving portion, wherein opening and closing of the drawer causes inward and outward movement of the first component with respect to the beverage maker body and wherein opening and closing of the cover with respect to the base provides access to the grounds receiving portion,
      wherein the second interchangeable component comprises a top half cover that is configured to be secured into the beverage maker body and a lower half base configured to be secured into the drawer, wherein the lower half base defines the grounds receiving portion, wherein opening and closing of the drawer causes movement of the lower half base with respect to the top half cover, wherein opening of the drawer provides access to the grounds receiving portion.

2. The apparatus of claim 1, wherein the body comprises internal rails and wherein the drawer comprises side rails that cooperate with the internal rails.

3. The apparatus of claim 1, wherein one of the series of interchangeable components is configured to receive a capsule module.

4. The apparatus of claim 1, wherein one of the series of interchangeable components is configured to receive loose coffee grounds.

5. The apparatus of claim 1, wherein one of the series of interchangeable components is configured to receive an espresso pod.

6. The apparatus of claim 1, further comprising a storage area in the body for storing the interchangeable components that are not used.

7. The apparatus of claim 1, further comprising a storage drawer for storing the interchangeable components that are not used.

8. A method of interchanging a beverage maker to work with a different coffee form, comprising:
   (a) providing a beverage maker brewing apparatus, comprising
      (i) a beverage maker body;
      (ii) a drawer configured to cooperate with the beverage maker, the drawer having an interior space to receive one of a series of interchangeable components; and
      (iii) a series of interchangeable components designed to contain different types of brewing capsules or modules, wherein each of the components in the series of interchangeable components comprises an outer profile that encloses and contains a selected brewing capsule or module, wherein the outer profile is consistent with the outer profile of the other components, the series of interchangeable components comprises a first interchangeable components and a second interchangeable component; wherein the first interchangeable component comprises a hinge securing a cover to a base, the base configured to be secured into the drawer, wherein the cover defines a grounds receiving portion, wherein opening and closing of the drawer causes inward and outward movement of the first component with respect to the beverage maker body and wherein opening and closing of the cover with respect to the base provides access to the grounds receiving portion,
         wherein the second interchangeable component comprises a top half that is configured to be secured into the beverage maker body and a lower half configured to be secured into the drawer, wherein the lower half base defines the grounds receiving portion, wherein opening and closing of the drawer causes movement of the lower half with respect to the top half, wherein opening of the drawer provides access to the ground receiving portion, wherein
            I. the base of the first interchangeable component is secured into the drawer, or
            II. the top half of the second interchangeable component is secured into the beverage maker body and the lower half of the second interchangeable component is secured into the drawer;
   (b) exchanging the first interchangeable component for the second interchangeable component or vice versa; and
   (c) brewing a beverage using the interchangeable component that was exchanged.

9. The method of claim 8, further comprising:
   (d) storing the first interchangeable component in a storage area on the beverage maker.

10. The method of claim 8, wherein the lower half of the second interchangeable component is configured to receive an espresso pod.

11. The method of claim 8, wherein the cover and the base of the first interchangeable component enclose a capsule or pod or loose coffee grounds contained in the grounds receiving portion.

* * * * *

UNITED STATES PATENT AND TRADEMARK OFFICE
CERTIFICATE OF CORRECTION

PATENT NO. : 9,687,106 B2
APPLICATION NO. : 14/069403
DATED : June 27, 2017
INVENTOR(S) : Abdelaziz Boubeddi et al.

Page 1 of 1

It is certified that error appears in the above-identified patent and that said Letters Patent is hereby corrected as shown below:

On the Title Page

Under Item (71) Applicant:

"Mohammad Ghalambor," should be corrected to read -- Mohammad Ghalambor Dezfuli --

Signed and Sealed this
Ninth Day of January, 2018

Joseph Matal
*Performing the Functions and Duties of the*
*Under Secretary of Commerce for Intellectual Property and*
*Director of the United States Patent and Trademark Office*